Dec. 29, 1953    J. W. DICKEY    2,664,489
ELECTRICAL HEATING SYSTEM
Original Filed Oct. 29, 1945

WITNESS:
Esther M. Stockton

INVENTOR.
John W. Dickey
BY Clinton L. Janes
ATTORNEY

Patented Dec. 29, 1953

2,664,489

UNITED STATES PATENT OFFICE 2,664,489

ELECTRICAL HEATING SYSTEM

John W. Dickey, Newfield, N. Y., assignor to Bendix Aviation Corporation, a corporation of Delaware Original application October 29, 1945, Serial No. 625,329. Divided and this application October 9, 1950, Serial No. 189,098

4 Claims. (Cl. 219—20)

The present invention relates to an electrical heating system, and more particularly to a system for automatically controlling the heating units of cooking stoves.

In electrical stoves such as are now supplied for domestic use, the surface heating units are usually manually controlled, regulation being secured by incorporating a plurality of heating elements of different capacity in each unit, and using a hand switch for connecting one or more of the elements to the supply mains in accordance with the estimated heat requirements. Arrangements of this kind have the disadvantages that the temperature of the material in the utensil which is being heated must be measured or estimated by observation, fine regulation cannot be secured without utilizing a large number of heating elements and a complicated switching mechanism, and the temperature of the utensil may rise to a scorching or burning point upon evaporation of the contents while unattended.

This application is a division of my prior application Serial Number 625,329, filed October 29, 1945.

It is an object of the present invention to provide a simple and inexpensive thermostatically controlled system for electric ranges permitting remote control setting of the desired temperature.

It is another object to provide such a system which will automatically and quickly secure and accurately maintain the desired temperature of the utensil to be heated.

It is another object to provide such a system which utilizes a heating unit having a single heating element, with means for automatically turning on and off said element at proper intervals to keep the utensil at a pre-set temperature.

It is a further object of the invention to provide such a device in which the temperature-sensitive element may be in the form of a rod or probe which may be readily inserted in the material which is being cooked in order to control the application of heat in accordance with the internal temperature of the material.

Figure 1:
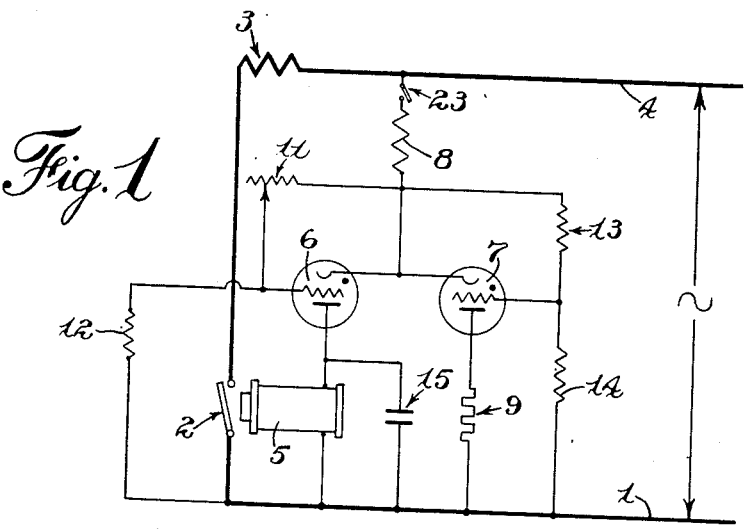
Figure 2:
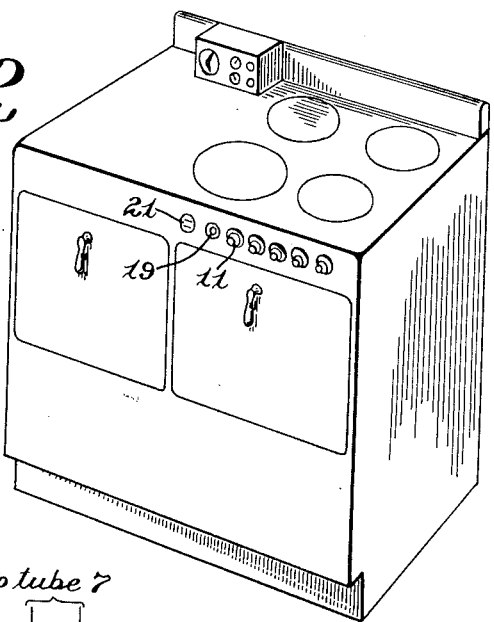
Figure 3:
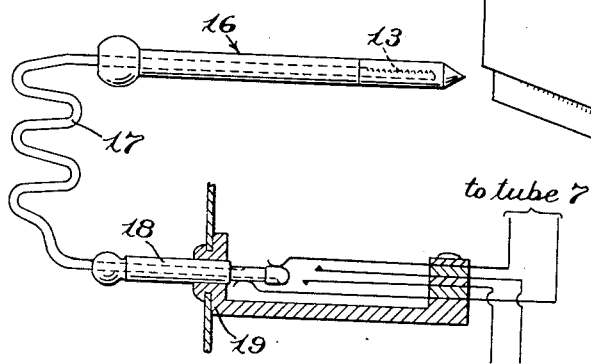

Further objects and advantages will be apparent from the following description taken in connection with the accompanying drawing, in which:

Fig. 1 is a diagrammatic representation of a system employing electronic control of the heating unit;

Fig. 2 is a perspective view of a domestic cooking range to which the present system has been applied; and Fig. 3 is an enlarged semi-diagrammatic detailed showing of a heat controlling element adapted to be plugged into a socket on the range so as to provide for control of one or more of the heating elements in accordance with the temperature of the material placed thereon into which the heat-sensitive element is inserted.

In Fig. 1 of the drawing, there is illustrated an embodiment of the invention in which the control of the heating switch is obtained electronically without mechanical moving parts. As there shown, a supply main 1 is connected through an electro-magnetic heating switch 2 to one end of the heater element 3, the opposite end of which is connected to the other supply main 4. A bridge circuit is provided for controlling the coil 5 of the heating switch 2 to maintain the desired temperature of the material to be heated. For this purpose, a pair of gas-filled triodes 6 and 7 have their cathodes connected in parallel to the supply main 4 through a dropping resistor 8. The plate of the triode 6 is connected to one terminal of the coil 5, the other terminal of which is connected to the supply lead 1 so that the triode 6 controls the energization of said coil from the supply mains. The plate of the triode 7 is connected to the supply main 1, preferably although not necessarily through a non-inductive resistor 9.

The grid of the triode 6 is connected to its cathode by a manually variable resistor 11 which is calibrated in terms of temperature as in the first embodiment. The grid is also connected to the supply main 1 through a bleeder resistor 12. In like manner, the grid of the triode 7 is connected to its cathode through a resistor 13 having a high temperature coefficient which is located in the position the temperature of which it is desired to control. The grid of the triode 7 is also connected to the supply main 1 through a bleeder resistor 14.

This circuit arrangement constitutes a bridge circuit or network having balanced arms in which are located the variable resistors 11, 13 and the bleeder resistors 12, 14 whereby the instantaneous bias of the grids of the triodes 6 and 7 depends upon the voltage drop across the variable resistors 11, 13 respectively.

Inasmuch as the mains 1, 4 are supplying alternating current at, for instance, 60 cycles, the grids of the triodes swing positive with respect to their cathodes during each oscillation of the supply current, but the amplitude of the swing of said grids is controlled by the variable resistors so that when the resistor 11 has a higher resistance than the resistor 13, the grid of triode 6 has a greater bias than the grid of the triode 7 so that triode 6 becomes conductive during the positive swing of its grid before the grid of the tube 7. Inasmuch as the triodes are of the gas-filled type, as soon as either tube becomes conductive, the resistance thereof drops to a low value so as to practically short-circuit the other tube, whereby the entire flow of current through the bridge network occurs through the one tube, the other remaining non-conductive. This sets up a pulsating rectified plate current flow through the conductive tube, and in the case of the tube 6, this plate current energizes the switch coil 5 to cause closure of heating switch 2. In case the tube 7 is the first to become conductive, its plate current is dissipated through resistor 9. A condenser 15 is preferably shunted around the switch coil 5 in order to smooth out the pulses of the plate current supplied by the tube 6 to the switch coil 5 and also to provide a non-inductive path for the initial flow of plate current, whereby the voltage drop through the circuit of the conductive tube is reduced immediately to a low value, thus precluding the possibility of the other tube being rendered conductive.

The resistor 13 is located in any position, the temperature of which it is desired to control. This may be in contact with a utensil to be heated, or the resistor may be located in a probe or rod as illustrated at 16 in Fig. 3, and connected by a flexible cord 17 to a plug 18 which may be plugged into a jack or socket 19 located on the stove as shown in Fig. 2. The jack is arranged as indicated diagrammatically in Fig. 3 so that the insertion of the plug 18 disconnects the heat control resistor from any desired one of the heating elements, and connects the resistor element 16 in place thereof. Added flexibility of control may be obtained by connecting a convenience socket 21 in parallel with the control circuit of this particular heater element whereby any extraneous heating device may be controlled by the resistor element 16, using for this purpose the manually controlled resistor 11 of the heating element in question.

In the operation of this embodiment of the invention, closure of a switch 23 in the bridge circuit connects the control system to the current supply. This may be accomplished manually or by means of a utensil-controlled switch if desired, as shown in my parent application above cited. The resistor 11 is then adjusted to the desired indicated temperature, and since the resistor 13 is initially at a low temperature, the resistance thereof is less than that of the resistor 11. The oscillations of the supply current thus cause the grid of the triode 6 to swing further than the grid of the triode 7, whereby tube 6 becomes conductive first, and a pulsating direct current is supplied to the switch coil 5 causing closure of the heat control switch 2 and energization of the heater element 3. When the article to be heated has attained the desired temperature, the control resistor 13, which is in contact therewith, reaches a value equal to that of the manually adjusted resistor 11. Any rise in temperature beyond this value causes the voltage drop through the resistor 13 to be greater than that through the manual resistor 11 whereby the tube 7 becomes conductive before the tube 6. The flow of plate current through the tube 6 is thus cut off, allowing the heat control switch 2 to open.

It will be noted that since alternating current is used in this embodiment of the invention, there is no need of a thermostatic interrupter such as illustrated in the parent application.

Although but one embodiment of the invention has been shown and described in detail, it will be understood that other embodiments are possible and various changes may be made in the form and arrangement of the parts without departing from the spirit of the invention as defined in the claims appended hereto.

I claim:

1. In an electrical heating system a heating element, an electrical circuit therefor including an electromagnetic switch having a magnet coil, and a control circuit for the switch including two parallel branches, one branch including the coil of the switch and the other branch comprising means for opposing energization of said coil, means including a thermally variable resistor for controlling the energization of one branch of the circuit, and means including a manually variable resistor for controlling the energization of the other branch of the circuit; said branches each including a gaseous discharge tube and means for controlling the conductivity of said tubes in accordance with the relative values of the thermally variable resistor and the manually variable resistor.

2. In an electrical heating system a heating element, an electrical circuit therefor including an electromagnetic switch having a magnet coil, and a control circuit for the switch including two parallel branches, one branch including the coil of the switch and the other branch comprising means for opposing energization of said coil, means including a thermally variable resistor for controlling the energization of one branch of the circuit, and means including a manually variable resistor for controlling the energization of the other branch of the circuit; said branches each including a gaseous discharge tube having a control grid, and said variable resistors being connected to control the bias of said grids to render conductive the tube in the switch-closing branch of the circuit when the temperature of the thermally variable resistor is below the desired temperature.

3. In an electrical heating system a heating element, an electrical circuit therefor including a source of alternating current and an electromagnetic switch, and a control network for the switch including a resistor connected across the source of power through two parallel branch paths, one path containing a grid-controlled gaseous discharge tube, and the other path containing a similar tube and the electro-magnet of said switch, a thermally responsive resistor and a manually variable resistor, and means associated with said two last mentioned resistors for so biasing the grids of the tubes as to selectively cause one or the other of said tubes to become conductive in accordance with the instantaneous relative values of said resistors.

4. A system as set forth in claim 3 in which said last named means comprises a voltage divider circuit including the thermally variable resistor, connected to the source of power for controlling the bias of the grid of the first mentioned tube, and a similar voltage divider circuit including the manually variable resistor for controlling the bias of the grid of the second mentioned tube.

JOHN W. DICKEY.

References Cited in the file of this patent

UNITED STATES PATENTS

| Number | Name | Date |
|---|---|---|
| 1,694,264 | Hull | Dec. 4, 1928 |
| 2,056,769 | Buchting | Oct. 6, 1936 |
| 2,103,513 | Campbell | Dec. 28, 1937 |
| 2,217,797 | Donovan, Jr. | Oct. 15, 1940 |
| 2,455,387 | Sippel | Dec. 7, 1948 |
| 2,467,856 | Rich | Apr. 19, 1949 |
| 2,552,480 | Dickey | May 8, 1951 |

FOREIGN PATENTS

| Number | Country | Date |
|---|---|---|
| 372,654 | Great Britain | May 12, 1932 |

OTHER REFERENCES

Hull: General Electric Rev.; 6/30; Reprint No. 491 (pages 17–23).

Hull: Abstract No. 735,929, published Jan. 31, 1950.